United States Patent
Le

(10) Patent No.: US 9,908,628 B2
(45) Date of Patent: Mar. 6, 2018

(54) PASSENGER SEAT

(71) Applicant: Zodiac Seats US LLC, Gainesville, TX (US)

(72) Inventor: Foek (Phuc) Nguyen Tien Le, Arlington, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/037,363

(22) PCT Filed: Nov. 19, 2014

(86) PCT No.: PCT/US2014/066297
§ 371 (c)(1),
(2) Date: May 18, 2016

(87) PCT Pub. No.: WO2015/077279
PCT Pub. Date: May 28, 2015

(65) Prior Publication Data
US 2016/0280378 A1    Sep. 29, 2016

Related U.S. Application Data

(60) Provisional application No. 61/906,052, filed on Nov. 19, 2013.

(51) Int. Cl.
*B64D 11/06*        (2006.01)
(52) U.S. Cl.
CPC ........ *B64D 11/064* (2014.12); *B64D 11/0642* (2014.12); *B64D 11/0643* (2014.12);
(Continued)

(58) Field of Classification Search
CPC .............. B64D 11/064; B64D 11/0642; B64D 11/0643; B64D 11/0644; B64D 11/0647; Y02T 50/46; A47C 3/02; B60N 2/10
See application file for complete search history.

(56) References Cited

U.S. PATENT DOCUMENTS 5,810,440 A * 9/1998 Unwalla ............ A47C 1/03294
297/300.2
5,967,609 A * 10/1999 Potter .................... A47C 1/027
297/261.3
(Continued)

FOREIGN PATENT DOCUMENTS

WO    2012160581 A1    11/2012

OTHER PUBLICATIONS

International Patent Application No. PCT/US2014/066297 Search Report and Written Opinion dated Feb. 19, 2015.
(Continued)

*Primary Examiner* — Philip F Gabler
(74) *Attorney, Agent, or Firm* — Kilpatrck Townsend & Stockton LLP; Dean W. Russell; Tiffany L. Williams

(57) ABSTRACT

Described are seat units having a lower support structure with at least two leg supports, each leg support integrally formed into an arcuate shape, and an upper support structure having a seat pan and seat back integrally formed into a single component. Each leg support is coupled to at least two base frame tubes by insertion of each base frame tube through an aperture in each of the leg supports, wherein the aperture is shaped to prevent rotation of the leg support about a longitudinal axis of each of the at least two base frame tubes. Each seat support is coupled to the base frame tubes by insertion of each base frame tube through a slot in each of the upper support structure.

20 Claims, 14 Drawing Sheets

(52) U.S. Cl.
CPC ...... *B64D 11/0644* (2014.12); *B64D 11/0647* (2014.12); *Y02T 50/46* (2013.01)

(56) References Cited

U.S. PATENT DOCUMENTS

| | | | | |
|---|---|---|---|---|
| 6,056,363 | A * | 5/2000 | Maddox | A47C 3/0257 297/115 |
| 6,334,648 | B1 | 1/2002 | Girsberger et al. | |
| 6,382,725 | B1 * | 5/2002 | Carroll | A47C 1/0347 297/325 |
| 6,669,143 | B1 * | 12/2003 | Johnson | B64D 11/06 244/118.6 |
| 6,776,454 | B1 * | 8/2004 | Aubert | A47C 1/03233 297/216.19 |
| 2007/0257534 | A1 | 11/2007 | Schulte et al. | |
| 2008/0088166 | A1 * | 4/2008 | Gardiner | B64D 11/06 297/344.14 |
| 2011/0108666 | A1 | 5/2011 | Pozzi et al. | |
| 2012/0104819 | A1 * | 5/2012 | Line | B60N 2/163 297/326 |
| 2014/0306502 | A1 * | 10/2014 | Manuel | A47C 3/0257 297/261.1 |

OTHER PUBLICATIONS

International Patent Application No. PCT/US2014/066297, International Preliminary Report on Patentability, dated Jun. 2, 2016.

\* cited by examiner

PASSENGER SEAT

CROSS REFERENCE TO RELATED APPLICATIONS

This application is the U.S. national phase entry of International Patent Application Serial No. PCT/US2014/066297 ("the '297 application"), filed on Nov. 19, 2014, which application is related to and claims priority benefits from U.S. Provisional Application Ser. No. 61/906,052 ("the '052 application"), filed on Nov. 19, 2013, entitled Arc Structure Aircraft Seat. The '297 and '052 applications are hereby incorporated in their entireties by this reference.

FIELD OF THE INVENTION

The invention relates to seat units for vehicle cabins, in particular seat units comprising an integrated leg support structure that optimizes a load path.

BACKGROUND

As is well-known, conventional aircraft seats are typically supported with an aluminum base frame assembly. Generally, the base frame assembly includes a pair of base frame tubes that extend across the front and rear of the seat, with spreader members that extend longitudinally along each side of the seat and couple to the base frame tubes. Leg assemblies are spaced along the length of the base frame tubes and connected to seat tracks mounted in the floor of the aircraft cabin. The position and spacing of the spreader members and leg assemblies may vary for different types of seats and different seating arrangements.

Because the size and shape of the seat components vary, multiple components must be individually machined, and each seat unit must be assembled from those multiple components, which is expensive from both a material and labor perspective. Furthermore, the weight of such seating units increases with increasing numbers of components.

Therefore, it may be desirable to design a seat frame that minimizes the number of components through an integral leg support design that combines the spreader and leg assembly into a single component. Such an integrated design may improve stress reduction and provide a better load path through the seat frame, as well as reducing weight of the seat unit and improving manufacturing efficiency by eliminating the need for additional machining and assembly steps of separate components.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat unit comprises a lower support structure comprising at least two leg supports, each leg support integrally formed into an arcuate shape, and an upper support structure comprising a seat pan and seat back integrally formed into a single component.

In some embodiments, each of the at least two leg supports is coupled to at least two base frame tubes by insertion of each of the at least two base frame tubes through at least two apertures in each of the at least two leg supports, wherein each of the at least two apertures is shaped to prevent rotation of the leg support about a longitudinal axis of each of the at least two base frame tubes.

The upper support structure may further comprise at least two seat supports integrally formed with the seat pan and the seat back, wherein each seat support is coupled to the at least two base frame tubes via at least two slots, wherein each of the at least two slots is shaped to slidingly engage with each of the at least two base frame tubes. The at least two slots may be shaped to allow the upper support structure to rotate along a path that is defined by a shape of the at least two slots. A first end of each of the at least two slots may correspond to a reclined position of the seat unit, and a second end of each of the at least two slots may correspond to an upright position of the seat unit.

In some embodiments, the seat unit may further comprise at least two arm rests, wherein each of the at least two arm rests is pivotally coupled to a rear portion of each of the at least two seat supports and is configured to remain substantially horizontal as the seat unit rotates between reclined and upright positions.

The seat pan may further comprise a front portion that is configured to bend downward in the reclined position of the seat unit when pressure is applied by legs of a passenger seated in the seat unit in the reclined position.

In some embodiments, the seat back comprises a headrest that is configured to slide away from the seat back to support a head of a passenger seated in the seat unit in the reclined position. The seat back may also comprise a curved design that is configured to contour to a shape of a back of a passenger seated in the seat unit.

According to certain embodiments of the present invention, a seat unit comprises a lower support structure comprising at least two leg supports, each leg support comprising a central portion, a front portion, and a rear portion, wherein the front portion and the rear portion extend downward from the central portion and are configured to couple to a seat track, an upper support structure comprising at least two seat supports, each seat support comprising a central portion, a front portion, and a rear portion, wherein the front portion and the rear portion extend upward from the central portion, and at least two base frame tubes, wherein each of the at least two base frame tubes is coupled to the lower support structure and the upper support structure by passing through one of at least two apertures in the central portion of each of the at least two leg supports and by passing through one of at least two slots in the central portion of each of the at least two seat supports.

In some embodiments, each of the at least two leg supports is integrally formed into an arcuate shape. The upper support structure may further comprise a seat pan and a seat back integrally formed into a single component.

In some embodiments, each of the at least two slots is shaped to allow the upper support structure to rotate along a path that is defined by a shape of each of the at least two slots. A first end of each of the at least two slots may correspond to a reclined position of the seat unit, and a second end of each of the at least two slots may correspond to an upright position of the seat unit.

According to certain embodiments, the seat unit may further comprise at least two arm rests, wherein each of the at least two arm rests is pivotally coupled to the rear portion of each of the at least two seat supports and is configured to remain substantially horizontal as the seat unit rotates between reclined and upright positions.

The seat back may comprise a curved design that is configured to contour to a shape of a back of a passenger seated in the seat unit.

According to certain embodiments of the present invention, a method of operating a seat unit comprising an upper support structure comprising at least two seat supports, a seat pan, and a seat back integrally formed into a single component, each seat support coupled to at least two base frame tubes via at least two slots, comprises actuating a recline mechanism and rotating the upper support structure so that each of the at least two base frame tubes is positioned adjacent a first end of each of the at least two slots and the seat back is in a reclined position.

In some embodiments, the seat pan further comprises a front portion that is configured to bend downward in the reclined position of the seat unit when pressure is applied by legs of a passenger seated in the seat unit in the reclined position.

The method may further comprise a step of actuating the recline mechanism, and rotating the upper support structure so that each of the at least two base frame tubes is positioned adjacent a second end of each of the at least two slots and the seat back is in an upright position.

The seat unit may further comprise at least two arm rests, wherein each of the at least two arm rests is pivotally coupled to a rear portion of each of the at least two seat supports and is configured to remain substantially horizontal as the seat unit rotates between reclined and upright positions.

BRIEF DESCRIPTION OF THE DRAWINGS

In the following detailed description, embodiments of the invention are described referring to the following figures.

DETAILED DESCRIPTION

Figure 1:
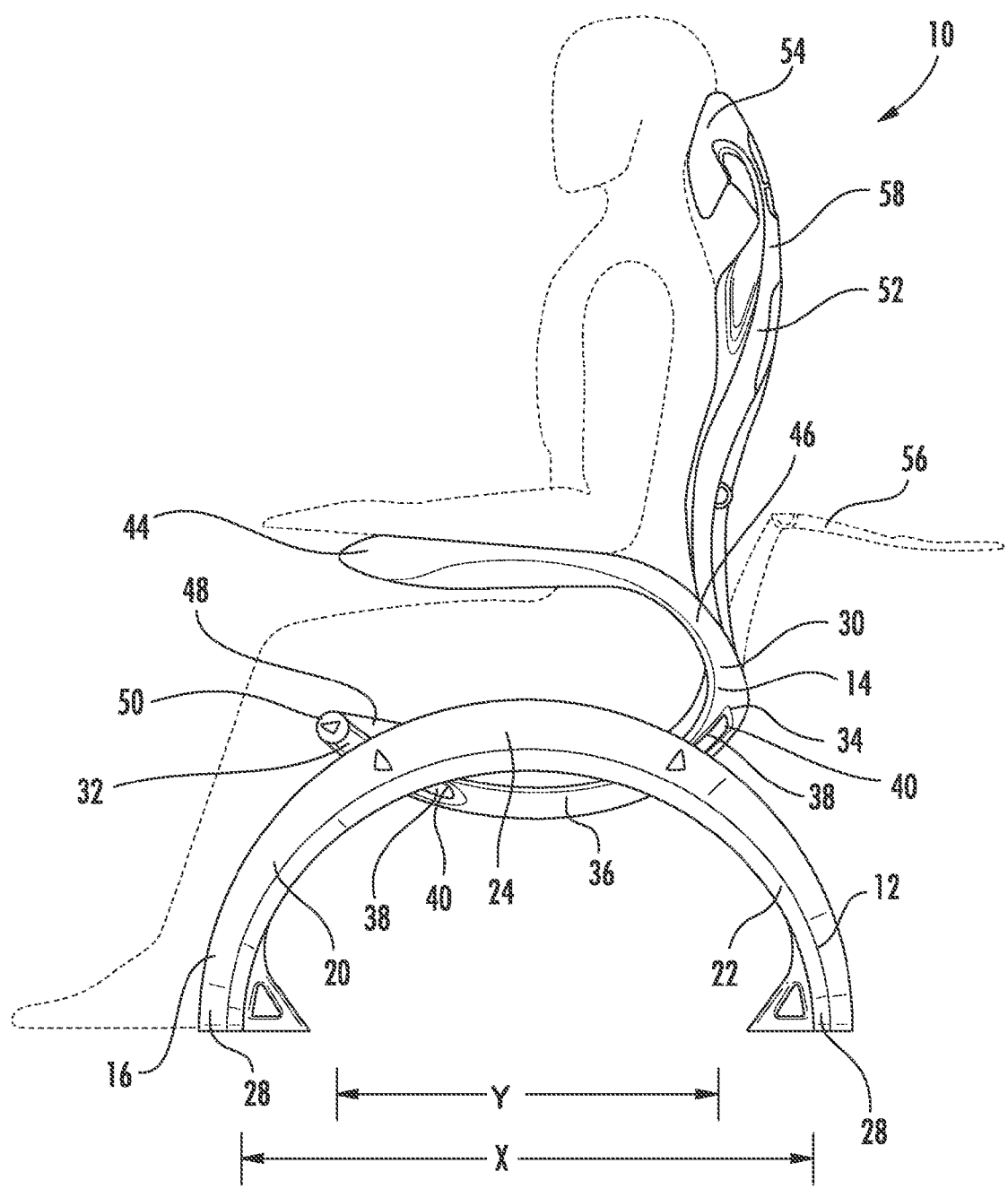
FIG. 1 is a side view of a seat unit, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of passenger seat units may be described with reference to an aircraft cabin, they are by no means so limited. In fact, the passenger seat units may be used in conjunction with any type of vehicle or otherwise as desired.

According to certain embodiments of the present invention, as illustrated in FIGS. 1-15, a seat unit 10 comprises a lower support structure 12 and an upper support structure 14.

In these embodiments, as best illustrated in FIGS. 2-4, 7, 9-12, and 14-15, the lower support structure 12 comprises at least two leg supports 16, which are connected to at least two base frame tubes 18. In certain embodiments, each leg support 16 may comprise a front portion 20 and a rear portion 22, each of which extends downward from a central portion 24. Each leg support 16 may be formed of aluminum, stainless steel, aramid fibers, other metallic materials, composite materials, other suitable plastic materials that may provide suitable load strength alone or in combination as a composite material, or other similar materials. The metallic materials, such as aluminum, stainless steel, and perhaps titanium in the structure can also be extruded, bent, and heat treated, thus eliminating the traditional machining process where there is a lot of waste. In certain embodiments, each leg support 16 is integrally formed as a single piece, which is described in more detail below.

In certain embodiments, the central portion 24 comprises a plurality of apertures 26, as best illustrated in FIGS. 2-4, 6-7, 9-12, and 14-15. At least two of the apertures 26 may be shaped to correspond to a cross-sectional shape of the base frame tubes 18 so that there is a snug fit between the base frame tube 18 and the aperture 26. For example, as shown in FIGS. 2-4 and 6-7, the apertures 26 and the cross-sectional shape of the base frame tubes 18 may have a triangular shape to prevent rotation of the leg support 16 about a longitudinal axis of the base frame tubes 18. In other embodiments, as shown in FIGS. 9-12 and 14-15, the apertures 26 and the cross-sectional shape of the base frame tubes 18 may have any suitable shape that allows the components to engage with one another in a non-rotational manner, including but not limited to elliptical, rectilinear, polygonal, keyhole, circular, or other similar shape.

Figure 6:
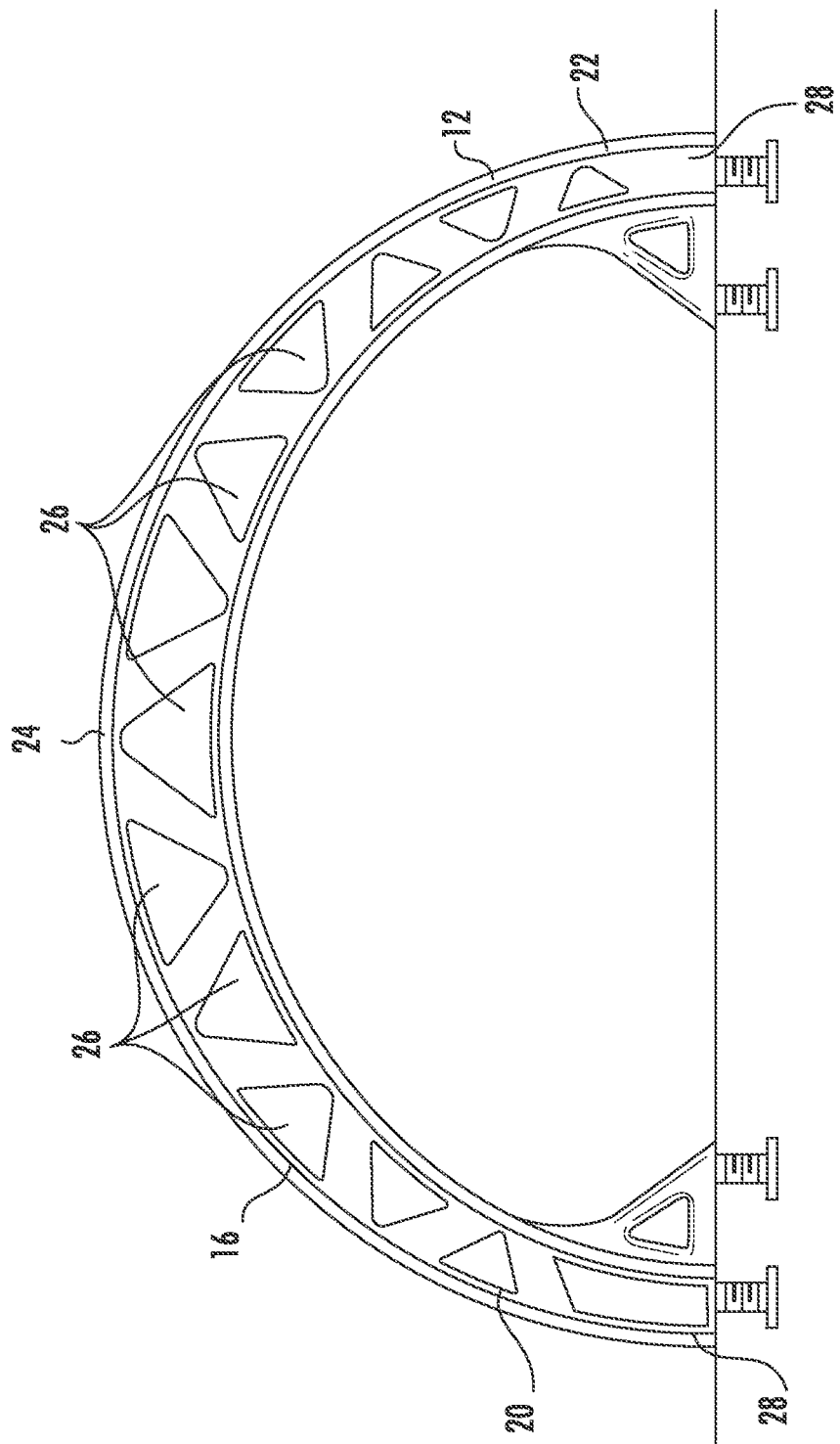
FIG. 6 is a side view of a leg support of a seat unit, according to certain embodiments of the present invention.
Figure 7:
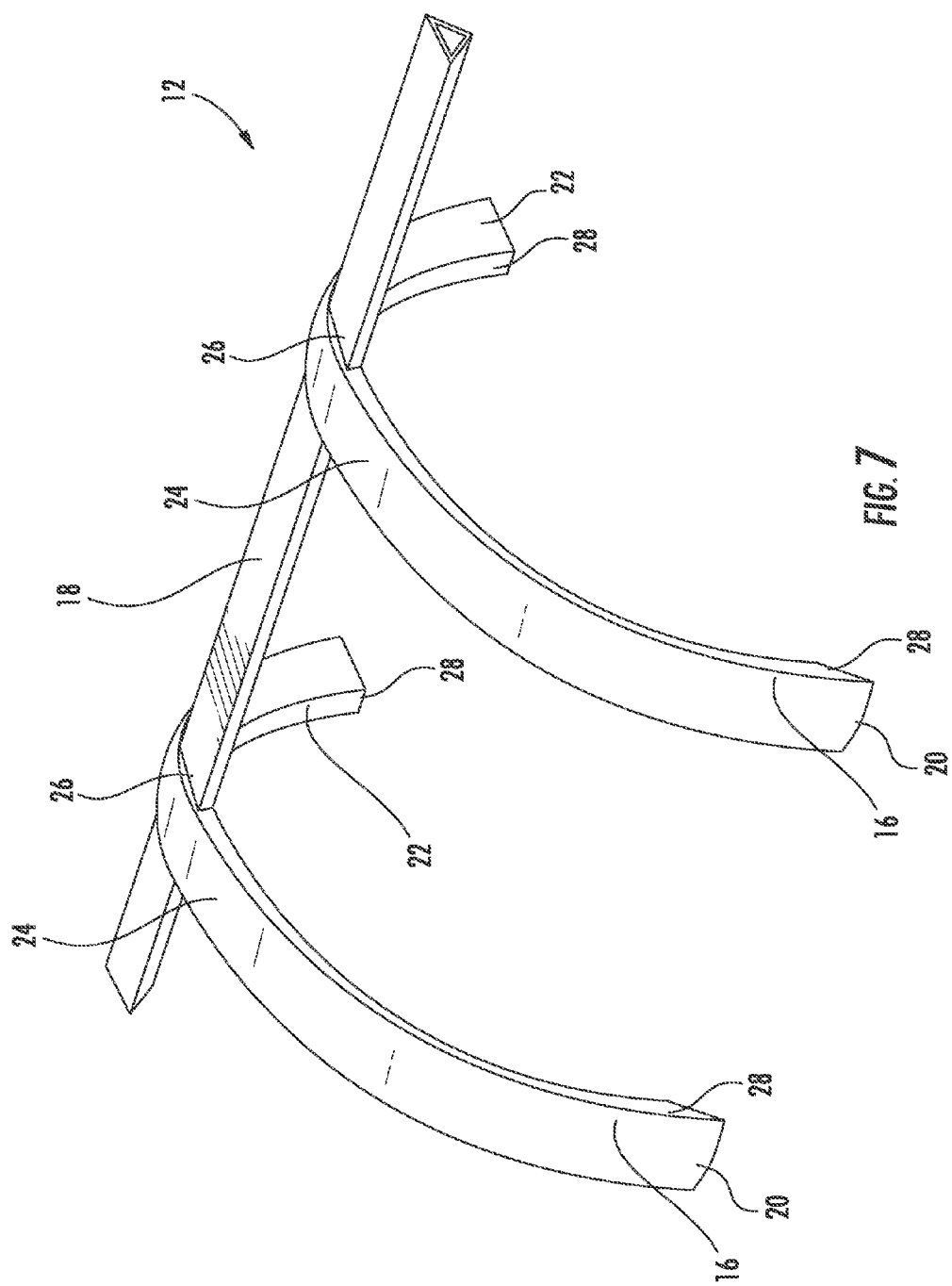
FIG. 7 is a perspective view of a pair of leg supports coupled to a base frame tube of a seat unit, according to certain embodiments of the present invention.
Figure 8:
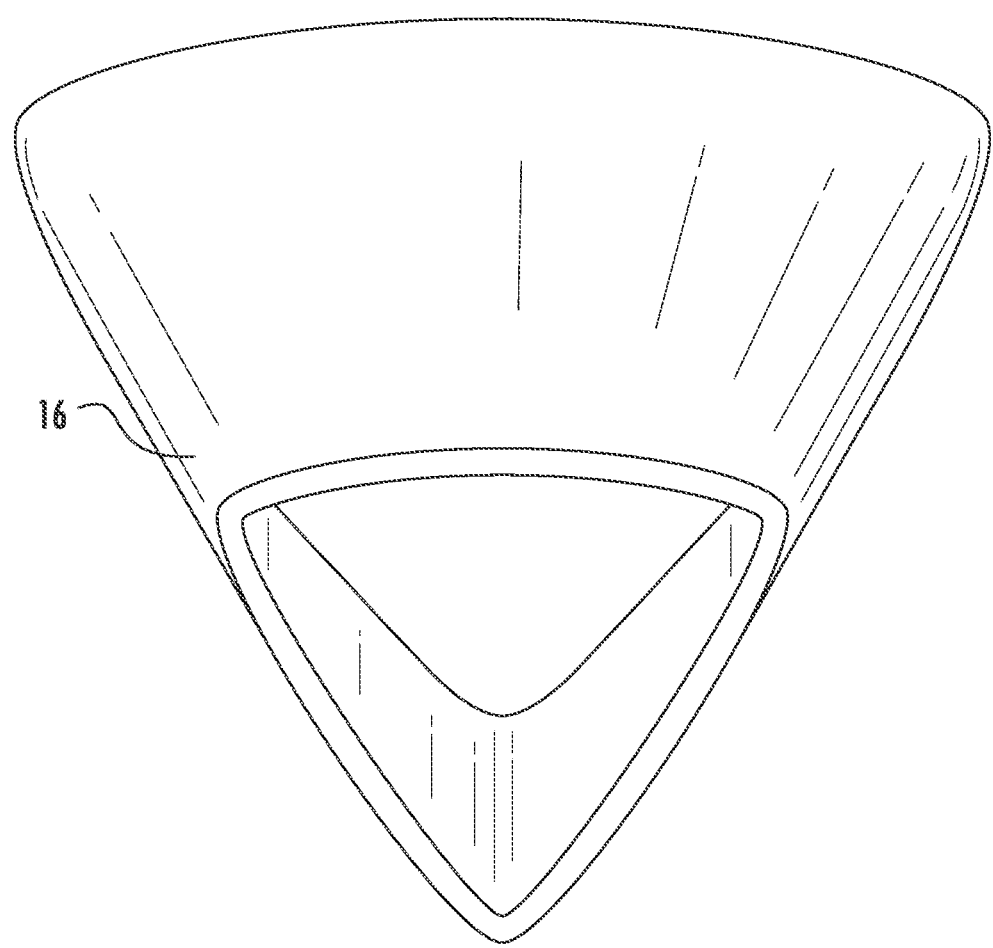
FIG. 8 is a perspective view of a cross-sectional portion of a leg support, according to certain embodiments of the present invention.
Figure 9:
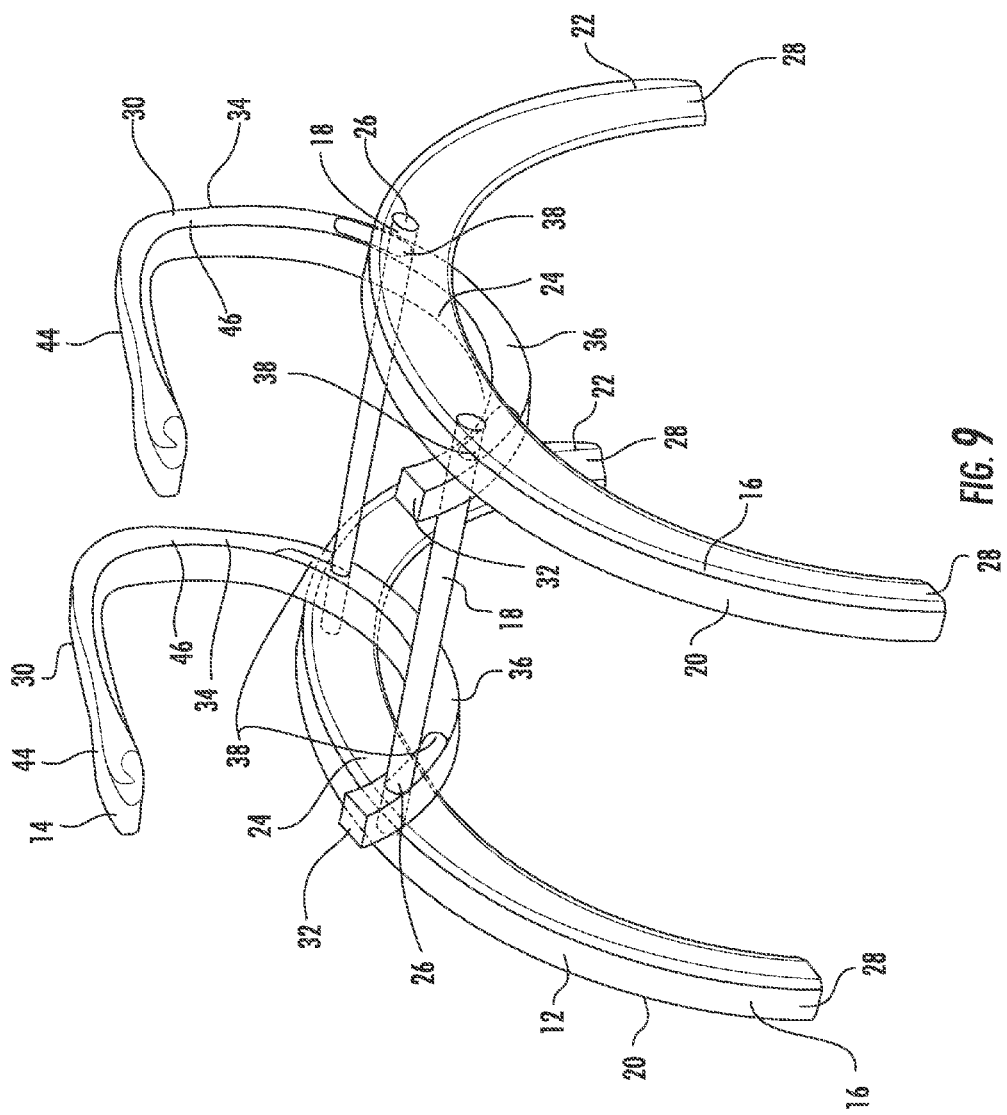
FIG. 9 is a perspective view of a seat unit, according to certain embodiments of the present invention.
Figure 10:
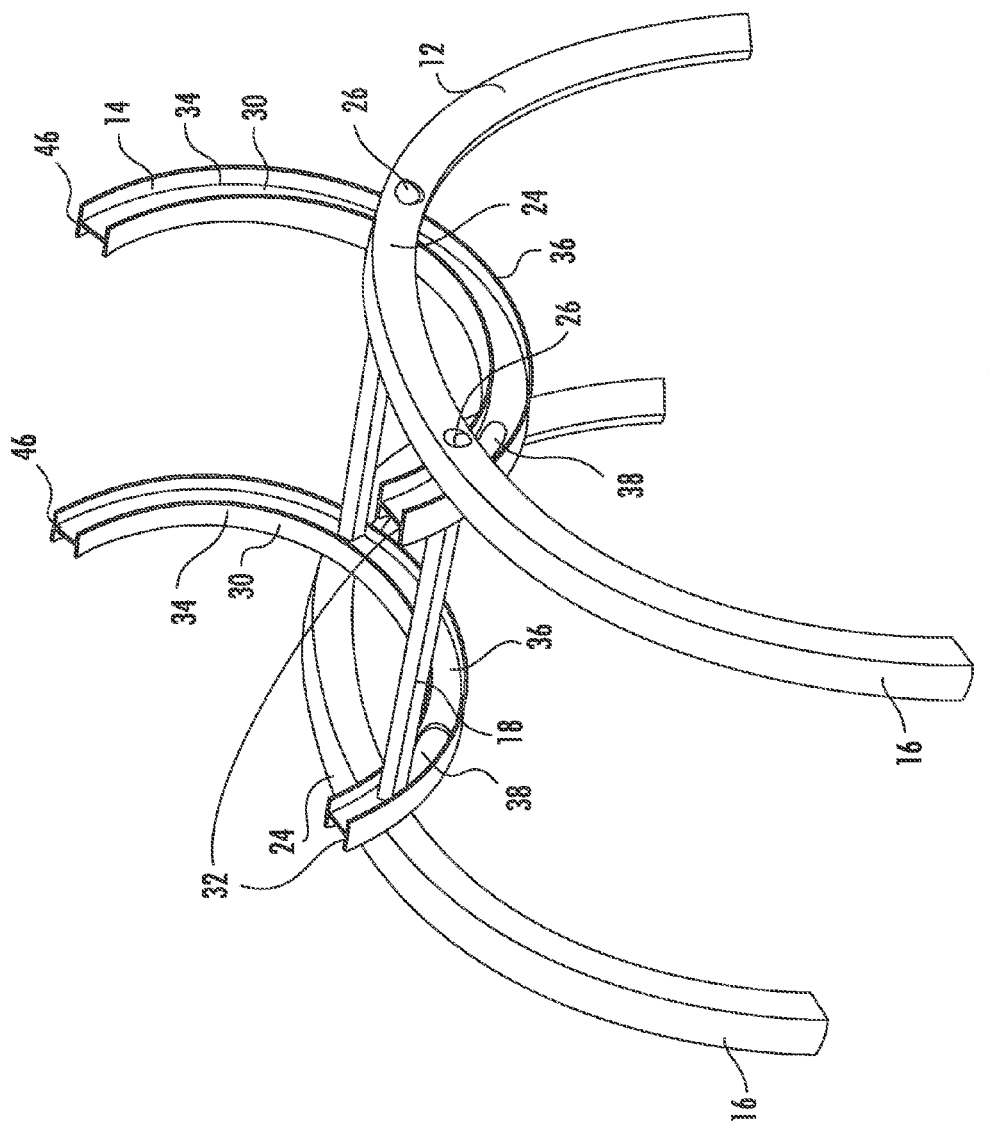
FIG. 10 is a perspective view of seat supports, leg supports, and base frame tubes of a seat unit, according to certain embodiments of the present invention.
Figure 11:
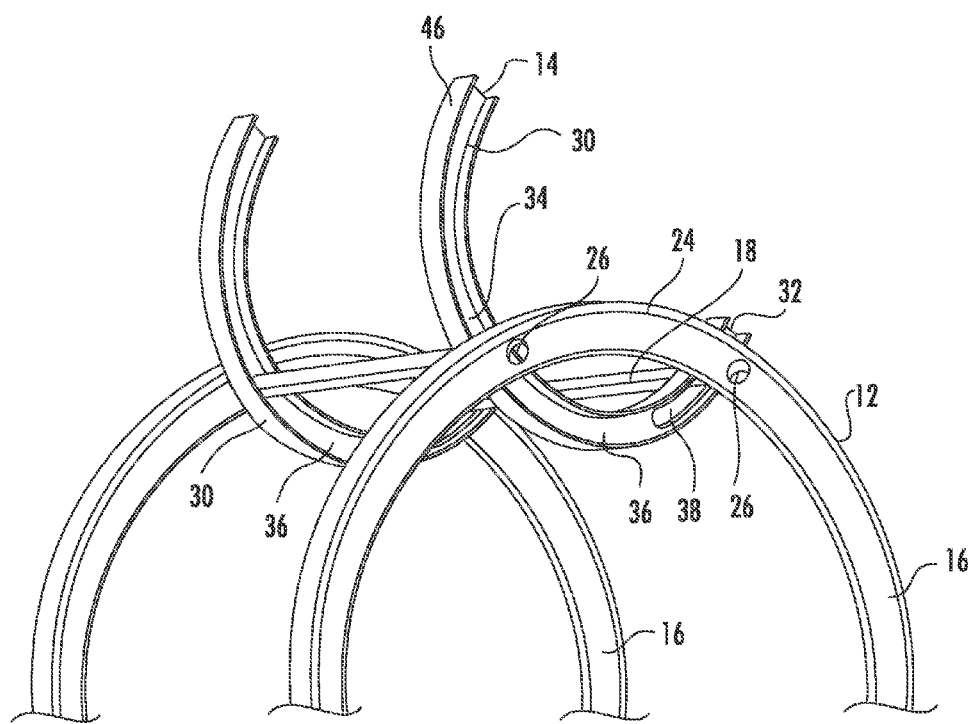
FIG. 11 is a rear perspective view of seat supports, leg supports, and base frame tubes of a seat unit, according to certain embodiments of the present invention.
Figure 12:
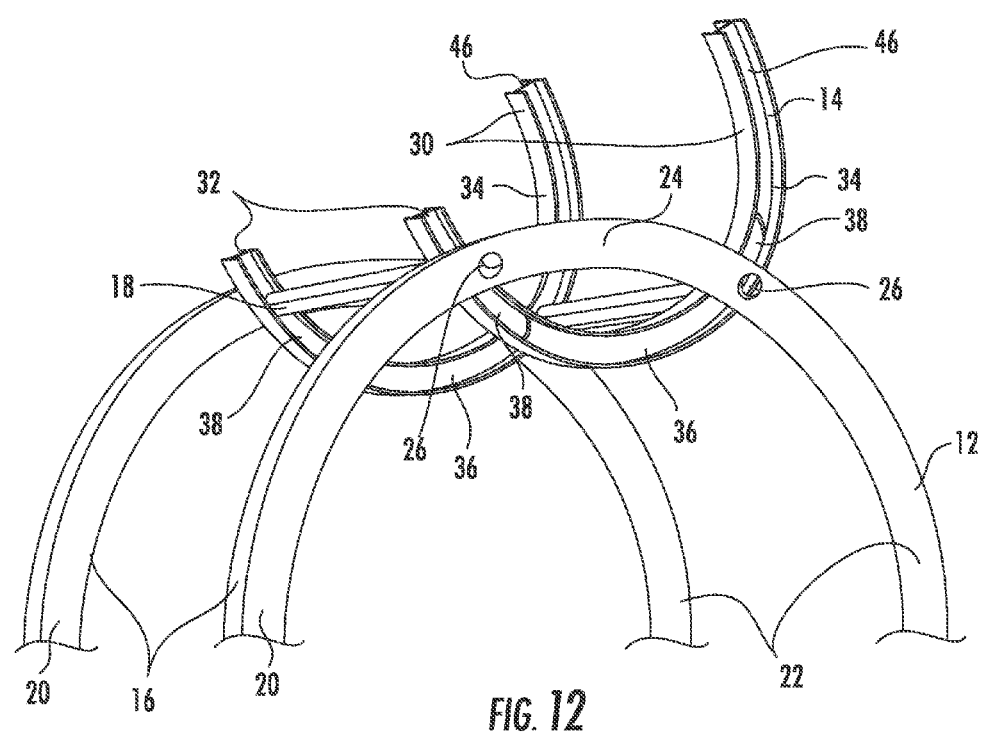
FIG. 12 is another perspective view of seat supports, leg supports, and base frame tubes of a seat unit, according to certain embodiments of the present invention.
Figure 13:
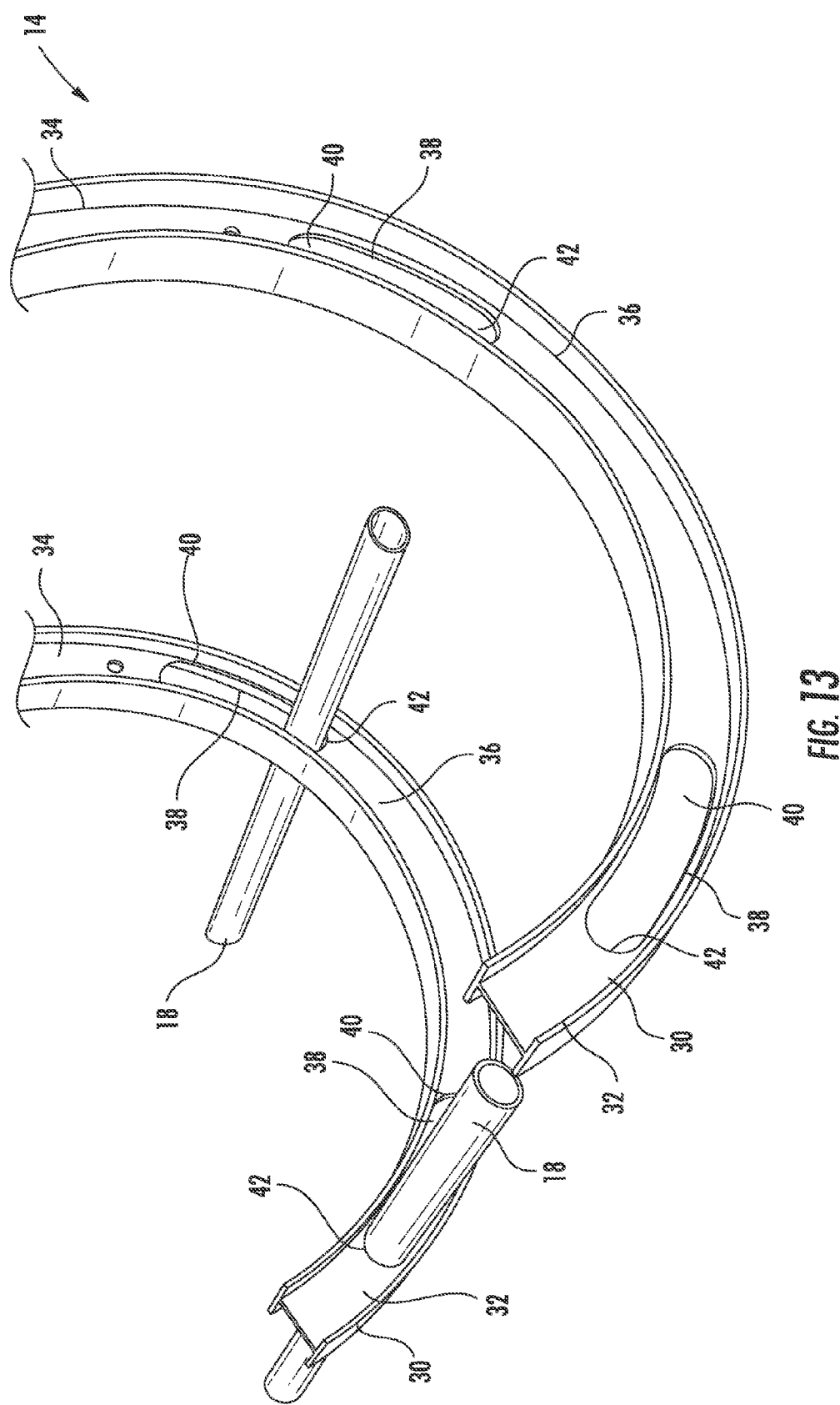
FIG. 13 is a partial perspective view of seat supports and base frame tubes of a seat unit, according to certain embodiments of the present invention.
Figure 14:
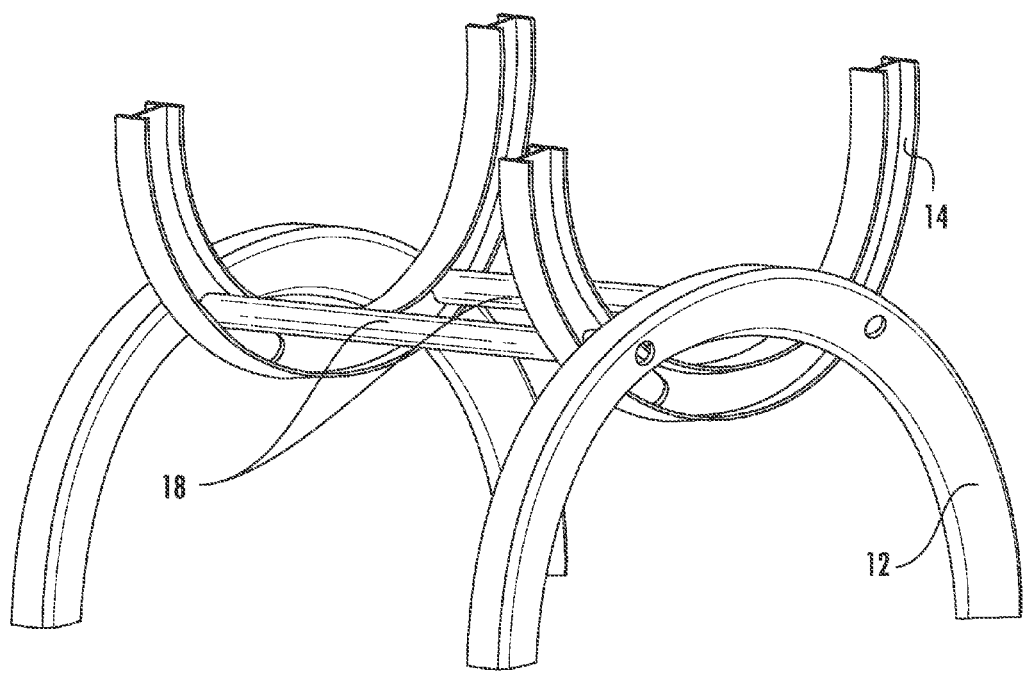
FIG. 14 is a perspective view of seat supports, leg supports, and base frame tubes of a seat unit, according to certain embodiments of the present invention.

The front portion 20 and/or the rear portion 22 may also comprise similar apertures 26, as illustrated in FIG. 6. These additional apertures in the central portion 24, the front portion 20, and/or the rear portion 22 may have the same or substantially similar shape as those apertures 26 that receive the base frame tubes 18 so as to provide other locations to engage with the cross-sectional shape of the base frame tubes 18, provide an aesthetically pleasing and cohesive look to the leg support 16, and/or reduce the overall weight of the leg support 16.

A lower end 28 of the front portion 20 and the rear portion 22 of each leg support 16 may comprise seat track fitting to enable each leg support 16 to couple to a seat track in the floor of the vehicle cabin. A person of ordinary skill in the relevant art will understand that any suitable connection devices may be used to couple the lower ends 28 to the seat track.

In certain embodiments, as best illustrated in FIGS. 1-5 and 9-15, the upper support structure 14 comprises at least two seat supports 30, which are also connected to the at least two base frame tubes 18. In certain embodiments, each seat support 30 may comprise a front portion 32 and a rear portion 34, each of which extend upward from a central portion 36. Each seat support 30 may be formed of aluminum, stainless steel, aramid fibers, other metallic materials, composite materials, other suitable plastic materials that may provide suitable load strength alone or in combination as a composite material, or other similar materials.

In certain embodiments, as best illustrated in FIGS. 1-3 and 9-15, the central portion 36 comprises at least two slots 38. Each of the slots 38 are shaped to slidingly engage with the cross-sectional shape of the base frame tubes 18. For example, the slots 38 may have a width that approximates a diameter or other dimension of the base frame tube, which is oriented substantially transverse to the slot 38 at the point that the slot 38 is engaged with the base frame tube 18.

Figure 2:
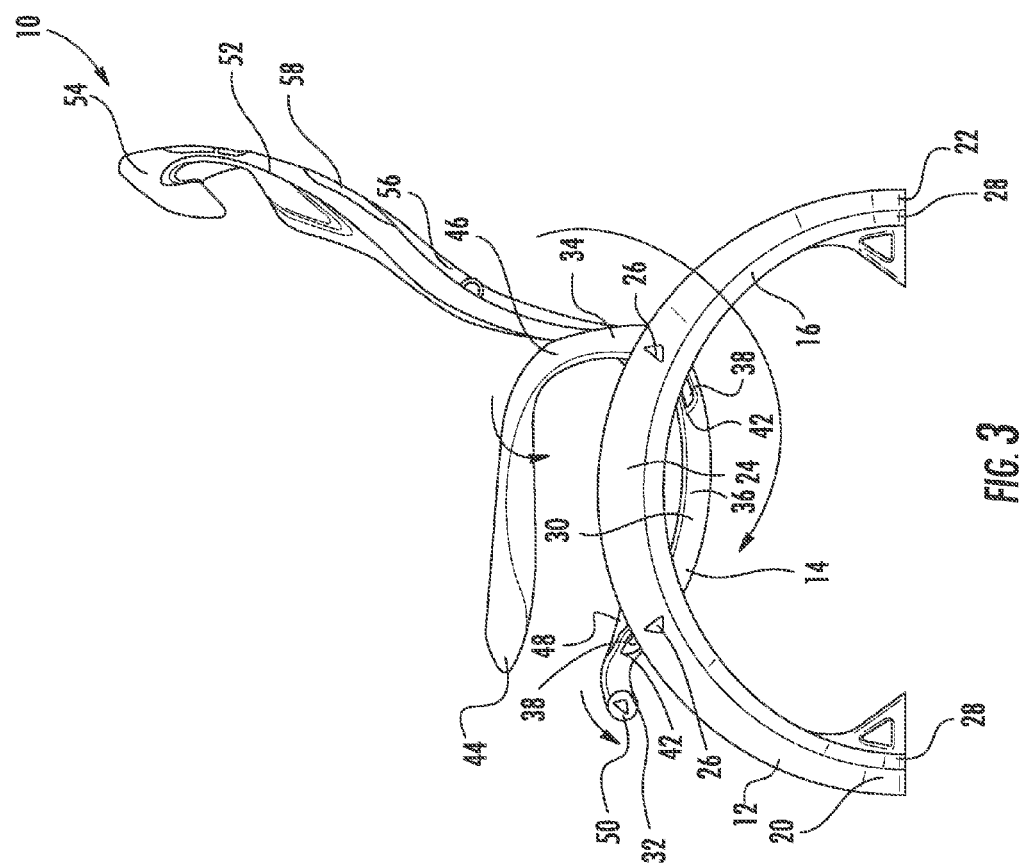
FIG. 2 is a side view of the seat unit of FIG. 1 in an upright position.
Figure 3:
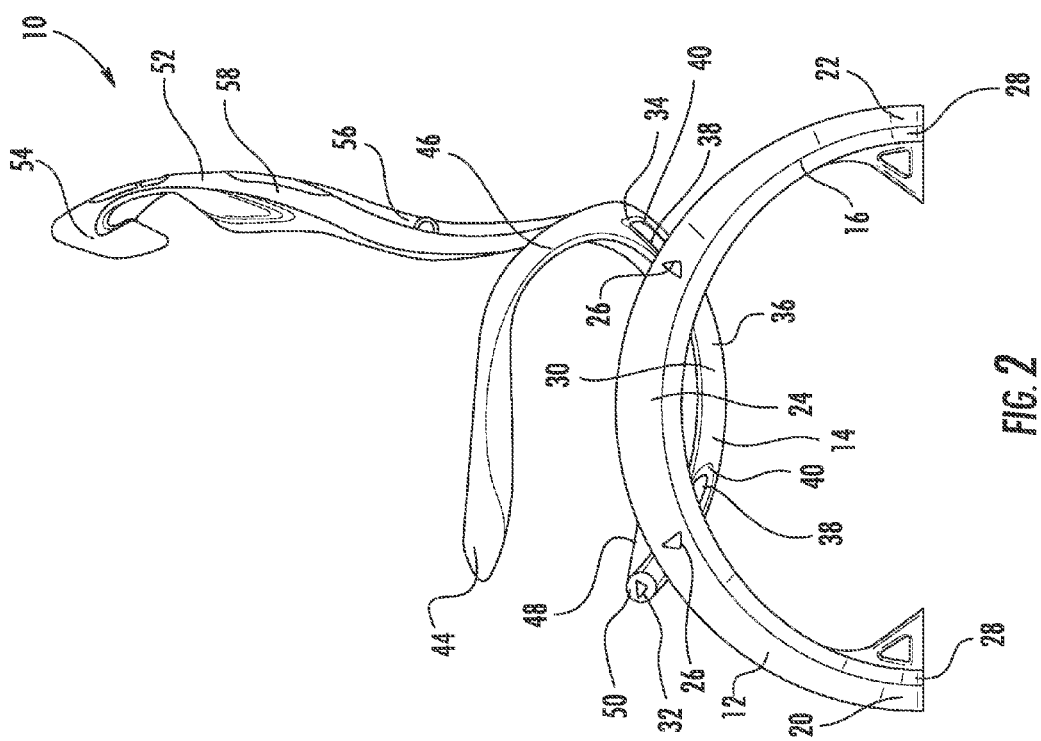
FIG. 3 is a side view of the seat unit of FIG. 1 in a reclined position.

In some embodiments, the two slots 38 are shaped to allow the seat support 30 to rotate along a path that is defined by the shape of the slots 38. In these embodiments, a first end 40 of each slot corresponds to a reclined position of the seat unit 10 (as shown in FIG. 3), and a second end 42 of each slot corresponds to an upright position of the seat unit 10 (as shown in FIG. 2).

In certain embodiments, as best illustrated in FIGS. 1-3 and 9, at least two arm rests 44 are coupled to the at least two seat supports 30. Specifically, each arm rest 44 may be coupled to an upper end 46 of the rear portion 34 of each seat support 30, which allows the arm rest 44 to remain substantially stationary and level when the upper support structure 14 rotates along the slots 38 between the upright and reclined positions, which is described in more detail below with regard to the recline mechanism.

A seat pan 48 may be positioned between and coupled to two seat supports 30. In some embodiments, the seat pan 48 may be integrally formed with the two seat supports 30. The seat pan 48 comprises a front portion 50 that may be detached from the seat supports 30. In certain embodiments, the seat pan 48 is formed of a flexible material, such as sheet metal, aluminum, composite materials (e.g. carbon fiber, sandwich panel constructions), smart textiles/fabrics, foams (e.g. High Density Polyurethane ("PUR") elastomer), or other similar materials. As a result, when the seat supports 30 are rotated into the reclined position, the front portion 50 may bend downward due to the pressure applied by the legs of a passenger seated in the seat unit 10, as shown in FIG. 3, to reduce pressure that may be applied to an upper leg (more specifically to reduce pressure that may be applied to the popliteal area on the backside of the upper leg) of a passenger seated in the seat unit 10.

In certain embodiments, a seat back 52 is coupled to the upper end 46 of the rear portion 34. The seat back 52 may be formed of aluminum, sheet metal, stainless steel, aramid fibers, polycarbonate, polypropylene, other metallic materials, composite materials (e.g. carbon fiber, sandwich panel constructions), smart textiles/fabrics, foams (e.g. High Density PUR elastomer), or other similar materials. The seat back 52 may be integrally formed with the seat pan 48 and/or with the seat supports 30. Alternatively, the seat back 52 may be fixedly coupled to the seat pan 48 and/or the seat supports 30. The integral and/or fixed coupling between the seat back 52 and the seat pan 48 and/or the seat supports 30 simplifies the reclining mechanism between the seat pan 48 and the seat back 52 because both elements rotate together as a single integrated unit.

As best illustrated in FIGS. 1-3, the seat back 52 may comprise a curved design that is configured to closely contour to a shape of a back of a passenger seated in the seat unit 10. The curved design is configured to provide increased support for the passenger seated in the seat unit 10, while also maximizing living space for a passenger seated behind the seat unit 10. In other designs, as shown in FIGS. 4-5, the seat back may have a low profile that is only configured to support the passenger's lower back, which may be suitable for short haul flights or to increase the amount of living space for passengers seated behind each seat unit 10.

The seat back 52 may further comprise a headrest 54, as illustrated in FIGS. 1-3. The headrest 54 may be coupled to the seat back 52 via a forward sliding mechanism, which allows the headrest 54 to slide away from the seat back 52 to better support a head of a passenger seated in the seat unit 10 in the reclined position. The headrest 54 may also be shaped to provide neck support by being shaped with a curved design that is configured to more closely contour to a shape of a lower head and neck of a passenger seated in the seat unit 10. In certain embodiments, the coupling mechanism between the headrest 54 and the seat back 52 also includes a vertical adjustment mechanism to allow the vertical position of the headrest 54 to be adjusted to accommodate passengers of different heights.

In certain embodiments, also illustrated in FIGS. 1-3, a tray table 56 may be coupled to an aft surface 58 of the seat back 52. Likewise, a display may be coupled to the aft surface 58. The display may be an OLED display, which may allow for a curved surface in-flight entertainment system and/or may increase the viewing angle.

Figure 4:
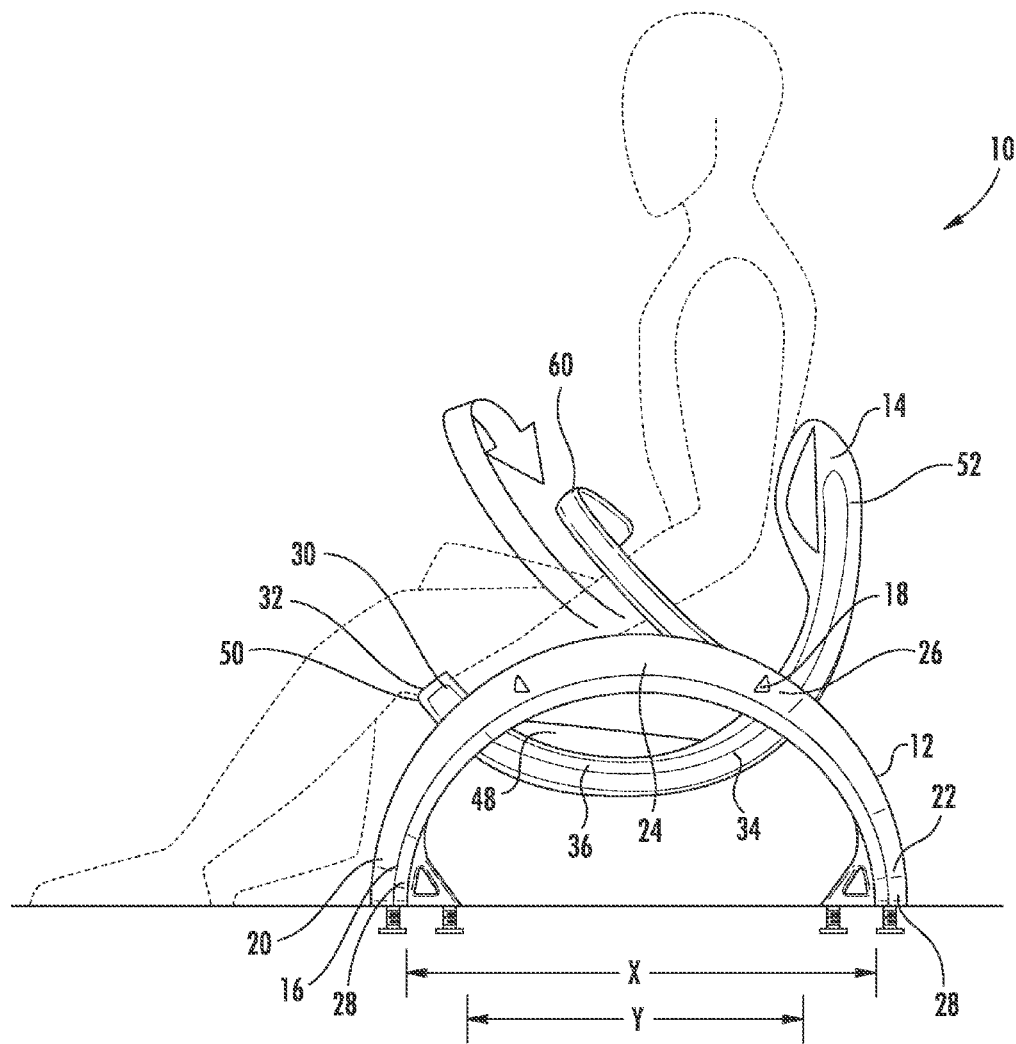
FIG. 4 is a side view of a seat unit, according to certain embodiments of the present invention.
Figure 5:
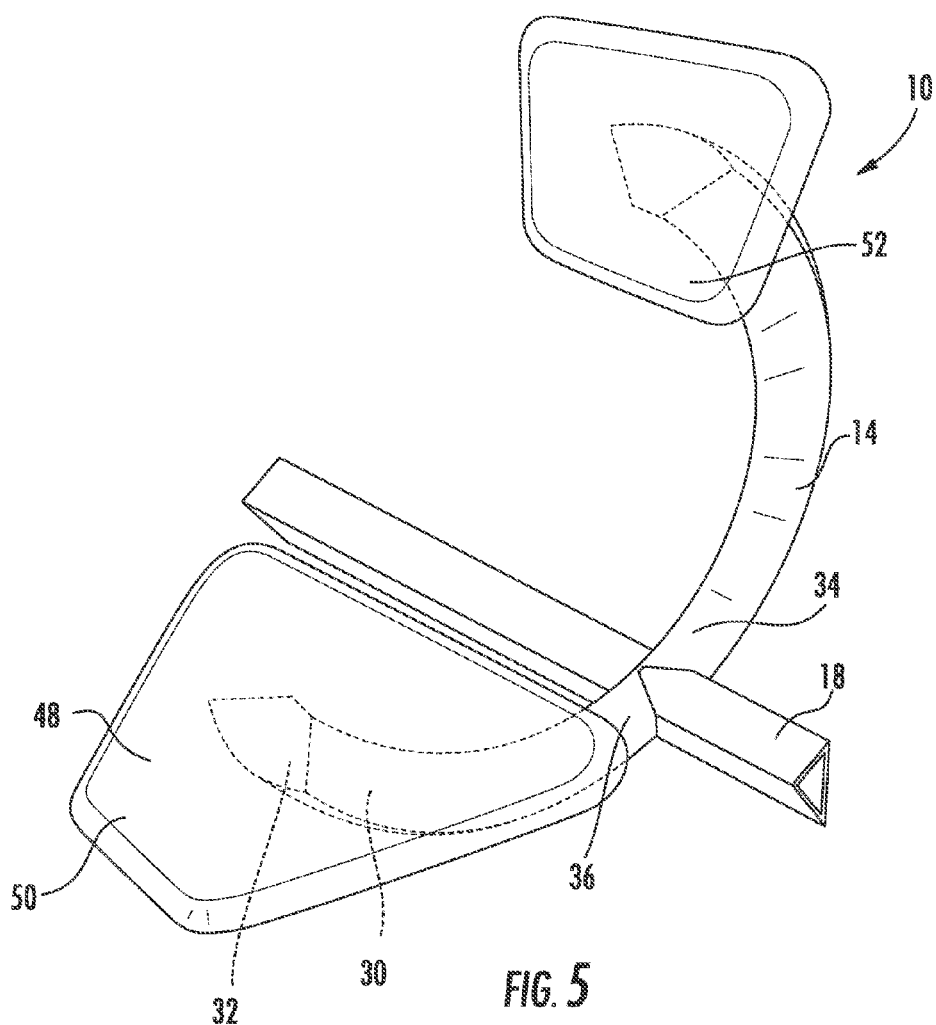
FIG. 5 is a perspective view of a seat pan and seat back of a seat unit, according to certain embodiments of the present invention.

In certain embodiments, as shown in FIGS. 4-5, a seat belt 60 is coupled to one of the base frame tubes.

In some embodiments, a controller for the recline mechanism is integrated into one of the arm rests 44. The recline mechanism is similar to that used for conventional aircraft seats, in which a recline lock or other similar actuator is used to hold the seat unit 10 in the respective position until the controller is actuated, thus allowing the recline lock to adjust positions. While actuated, the recline lock is released from a compressed state, which then rotates the seat supports 30 toward the front of the seat unit 10 and rotates the seat back 52 into the reclined position. Once the reclined position is reached, the controller is released and the entire upper support structure 14 is locked into the reclined position. The recline lock may be coupled to a lower surface of the seat pan 48 and one of the base frame tubes 18, similar to the coupling locations found in conventional aircraft seats.

To return the seat unit 10 to the upright position, the controller is again actuated to allow the recline lock to be compressed. When actuated, the passenger seated in the seat unit 10 leans forward and presses against the front portion 50 of the seat pan 48, which causes the recline lock to return to a compressed state, which then rotates the seat supports 30 toward the rear of the seat unit 10 and rotates the seat back 52 into the upright position. Once the uprights position is reached, the controller is released and the entire upper support structure 14 is locked into the upright position.

In the embodiments where the arm rests 44 are pivotally coupled to the upper end 46 of the rear portion 34 of the seat support 30, the pivotal coupling may include a release mechanism that is actuated when a passenger presses the recline controller. The release mechanism is configured to allow the arm rests 44 to remain substantially stationary in a horizontal orientation while the remainder of the upper support structure 14 rotates between reclined and upright positions. When the controller is released, the release mechanism is also locked into place, thereby securing the position of the arm rests 44.

In certain embodiments, the leg support 16 combines the traditional legs and spreader used for conventional aircraft seats into a single component. In order to provide a suitable combined replacement, each leg support 16 comprises a design that distributes a downward load as effectively as or better than the conventional combination of a spreader with traditional legs. In certain embodiments, the arcuate shape of the leg supports 16 provides for optimal load (i.e., 16G and 14G distribution).

The use of a combined single component may reduce the additional weight that results from using separate components, shorten assembly time, and/or improve the load path through the seat over that of conventional frame assemblies described above. Moreover, the leg supports 16 (as well as the seat supports 30) may be manufactured by extruding, bending, and heat treating each integrally formed part, which eliminates waste and inefficiencies associated with the traditional machining process. For example, any cross-section of I-beam, C-channel, circular, triangular, rectangular, or other suitable shape may be machined, forged, beam bended, and heat treated or hydro formed into the appropriate arcuate shape. However, a person of ordinary skill in the relevant art will understand that any suitable shape may be used for the integrally formed leg support 16 that provides similar improved load paths and/or other efficiency improvements.

Figure 15:
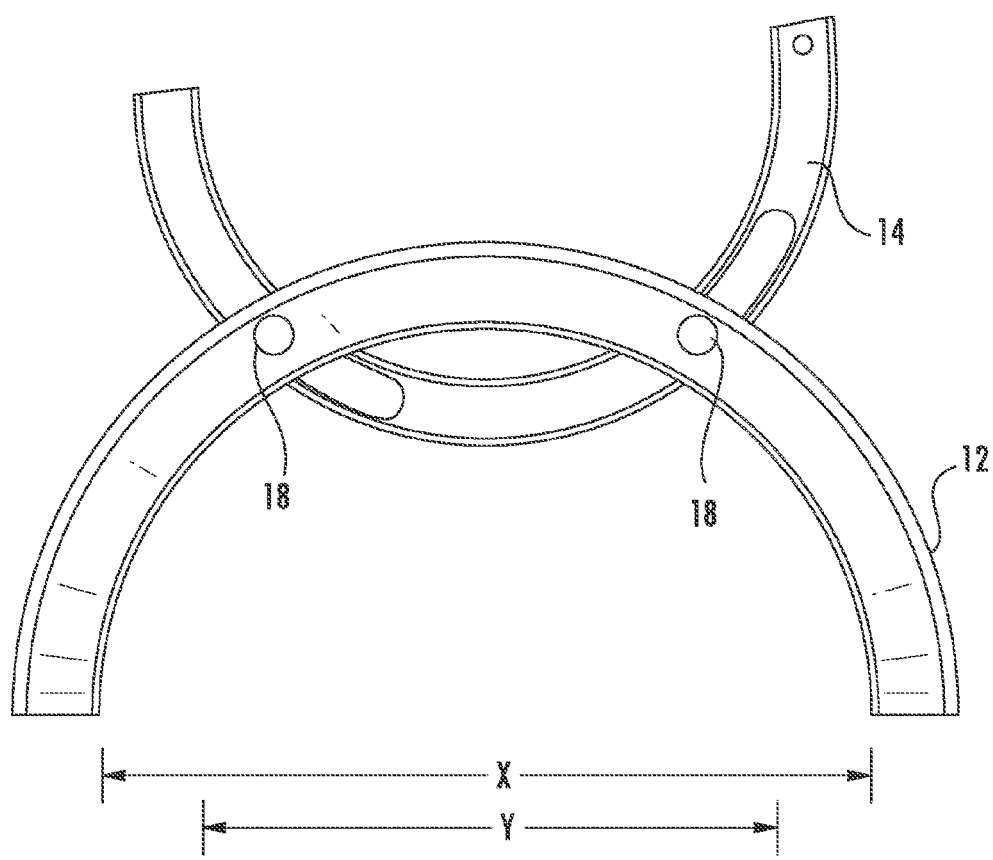
FIG. 15 is a side view of seat supports, leg supports, and base frame tubes of a seat unit, according to certain embodiments of the present invention.

In some embodiments, the design is a downwardly oriented arcuate shape that allows the load to be dispersed over the arch. In some embodiments, as shown in FIG. 1, the leg support 16 has a longitudinal dimension X (defined as the greatest distance between the front portion 20 and the rear portion 22) that exceeds a longitudinal dimension Y of the adjacent seat support 30 (defined as the greatest distance between the front portion 32 and the rear portion 34). In other embodiments, as shown in FIGS. 4 and 15, the longitudinal dimension X of the leg support 16 is substantially the same or only slightly larger than the longitudinal dimension Y the seat support 30. Furthermore, the leg support 16 may have any suitable radius, such as radius arcs ranging from 10.295 inches (26.14 cm) to 15.50 inches (39.37 cm), which defines the profile of the seat unit 10 (i.e., the overall longitudinal length and height required for the seat unit 10).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat unit comprising:
   at least one base frame tube;
   a pair of seat supports;
   a seat pan comprising a front portion and a rear portion, the seat pan being positioned between the pair of seat supports, wherein the rear portion of the seat pan is attached to the pair of seat supports and the front portion of the seat pan is detached from the pair of seat supports;
   wherein the pair of seat supports are slidingly coupled to the at least one base frame tube so as to allow the pair of seat supports to rotate between a reclined position wherein the pair of seat supports are rotated toward a front of the seat unit relative to the at least one base frame tube, and an upright position wherein the pair of seat supports are rotated toward a rear of the seat unit relative to the at least one base frame tube;
   wherein, when the pair of seat supports are rotated toward the front of the seat unit relative to the at least one base frame tube, the front portion of the seat pan is configured to bend downward to reduce pressure applied to a popliteal area on a backside of a passenger's upper leg when the passenger is seated in the seat unit.

2. The seat unit of claim 1, wherein the seat supports are coupled to the at least one base frame tube via a slot in each of the seat supports, wherein each slot is shaped to slidingly engage with the at least one base frame tube.

3. The seat unit of claim 2, wherein the slots are shaped to allow the pair of seat supports to rotate along a path that is defined by a shape of the slots.

4. The seat unit of claim 3, wherein a first end of each slot corresponds to the reclined position of the seat unit, and a second end of each slot corresponds to the upright position of the seat unit.

5. The seat unit of claim 4, further comprising a pair of arm rests, wherein each arm rest is coupled to a rear portion of each seat support.

6. The seat unit of claim 1, further comprising a lower support structure comprising at least two leg supports, each leg support integrally formed into an arcuate shape.

7. The seat unit of claim 6, wherein each of the at least two leg supports is coupled to at least one base frame tube by insertion of each of the at least one base frame tube through an aperture in each of the at least two leg supports, wherein each of the apertures is shaped to prevent rotation of the leg support about a longitudinal axis of the at least one base frame tube.

8. The seat unit of claim 1, further comprising a seat back integrally formed with the seat pan as a single component.

9. The seat unit of claim 8, wherein the seat back comprises a headrest that is configured to support a head of a passenger seated in the seat unit in the reclined position.

10. The seat unit of claim 8, wherein the seat back comprises a curved design that is configured to contour to a shape of a back of the passenger seated in the seat unit.

11. A seat unit comprising:
a lower support structure comprising at least two leg supports, each leg support comprising a central portion, a front portion, and a rear portion, wherein the front portion and the rear portion extend downward from the central portion and are configured to couple to a seat track;
an upper support structure comprising at least two seat supports, each seat support comprising a central portion, a front portion, and a rear portion, wherein the front portion and the rear portion extend upward from the central portion;
a seat pan comprising a front portion and a rear portion, the seat pan being positioned between the at least two seat supports, wherein the rear portion of the seat pan is attached to the at least two seat supports and the front portion of the seat pan is detached from the at least two seat supports; and
at least two base frame tubes, wherein each of the at least two base frame tubes is coupled to the lower support structure and the upper support structure in a manner that allows the at least two seat supports to rotate between a reclined position wherein the at least two seat supports are rotated toward a front of the seat unit relative to the at least two base frame tubes, and an upright position wherein the at least two seat supports are rotated toward a rear of the seat unit relative to the at least two base frame tubes;
wherein, when the at least two seat supports are rotated toward the front of the seat unit relative to the at least two base frame tubes, the front portion of the seat pan is configured to bend downward to reduce pressure applied to a popliteal area on a backside of a passenger's upper leg when a passenger is seated in the seat unit.

12. The seat unit of claim 11, wherein each of the at least two leg supports is integrally formed into an arcuate shape.

13. The seat unit of claim 11, wherein the upper support structure further comprises a seat back integrally formed with the seat pan as a single component.

14. The seat unit of claim 13, wherein the at least two seat supports are coupled to the at least two base frame tubes via at least two slots in each seat support, wherein the slots are shaped to allow the upper support structure to rotate along a path that is defined by a shape of the slots.

15. The seat unit of claim 14, wherein a first end of each slot corresponds to the reclined position of the seat unit, and a second end of each slot corresponds to the upright position of the seat unit.

16. The seat unit of claim 15, further comprising at least two arm rests, wherein each arm rest is coupled to the rear portion of each seat support.

17. The seat unit of claim 13, wherein the seat back comprises a curved design that is configured to contour to a shape of a back of the passenger seated in the seat unit.

18. A method of operating a seat unit, the seat unit comprising an upper support structure comprising at least two seat supports, a seat pan, and a seat back integrally formed into a single component, wherein the seat pan comprises a front portion and a rear portion, the front portion being detached from the at least two seat supports, each seat support slidingly coupled to at least two base frame tubes, the method comprising:
actuating a recline mechanism;
rotating the upper support structure so that the at least two seat supports are rotated toward a front of the seat unit relative to the at least two base frame tubes, and the seat back is in a reclined position;
bending the front portion of the seat pan downward to reduce pressure applied to a popliteal area on a backside of a passenger's upper leg.

19. The method of claim 18, further comprising a step of actuating the recline mechanism, and rotating the upper support structure so that the at least two seat supports are rotated toward a rear of the seat unit relative to the at least two base frame tubes, and the seat back is in an upright position.

20. The method of claim 19, further comprising at least two arm rests, wherein each arm rest is coupled to a rear portion of each seat support.

* * * * *